United States Patent
Rice et al.

(10) Patent No.: US 7,221,499 B2
(45) Date of Patent: May 22, 2007

(54) FREQUENCY SCANNED ARRAY CONTROL SYSTEM

(75) Inventors: Robert R. Rice, Simi Valley, CA (US); Sami A. Shakir, Albuquerque, NM (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/254,933

(22) Filed: Oct. 19, 2005

(65) Prior Publication Data

US 2007/0086785 A1   Apr. 19, 2007

(51) Int. Cl.
*H01S 3/00* (2006.01)

(52) U.S. Cl. .................. 359/349; 359/337.11

(58) Field of Classification Search .......... 359/337.11, 359/349
See application file for complete search history.

(56) References Cited

U.S. PATENT DOCUMENTS

| | | | | |
|---|---|---|---|---|
| 3,825,845 | A * | 7/1974 | Angelbeck et al. | 359/349 |
| 4,757,268 | A * | 7/1988 | Abrams et al. | 359/338 |
| 5,694,408 | A * | 12/1997 | Bott et al. | 372/6 |
| 5,717,516 | A * | 2/1998 | Klein et al. | 359/334 |
| 5,774,490 | A * | 6/1998 | Miller et al. | 372/89 |
| 5,832,006 | A * | 11/1998 | Rice et al. | 372/3 |
| 5,847,816 | A * | 12/1998 | Zediker et al. | 356/5.09 |
| 6,061,170 | A * | 5/2000 | Rice et al. | 359/345 |
| 6,200,309 | B1 * | 3/2001 | Rice et al. | 606/10 |
| 6,317,257 | B1 * | 11/2001 | Upton et al. | 359/349 |
| 6,366,356 | B1 * | 4/2002 | Brosnan et al. | 356/477 |
| 6,452,718 | B1 * | 9/2002 | Augustsson | 359/337.1 |
| 6,480,327 | B1 * | 11/2002 | Betin | 359/338 |
| 6,597,836 | B2 * | 7/2003 | Johnson et al. | 385/33 |
| 6,678,288 | B2 * | 1/2004 | Rice | 372/6 |
| 6,791,747 | B2 * | 9/2004 | Fan | 359/349 |
| 6,813,069 | B2 * | 11/2004 | Rice et al. | 359/349 |
| 7,058,098 | B1 * | 6/2006 | Shay | 372/29.016 |
| 7,065,110 | B2 * | 6/2006 | Rice et al. | 372/21 |
| 7,088,743 | B2 * | 8/2006 | Rice et al. | 372/6 |
| 2004/0095968 | A1 * | 5/2004 | Avizonis et al. | 372/6 |
| 2005/0135815 | A1 * | 6/2005 | Gerwe et al. | 398/188 |
| 2006/0262815 | A1 * | 11/2006 | Klimov et al. | 372/18 |

OTHER PUBLICATIONS

Mar et al. Mode-Locked Operation of a Master Oscillator Power Amplifier. IEEE Photonics Technology Letters, vol. 6, No. 9, Sep. 1994.*

* cited by examiner

*Primary Examiner*—Deandra M. Hughes
(74) *Attorney, Agent, or Firm*—Carmen B. Patti & Assoc., LLC

(57) ABSTRACT

An optical fiber amplifier array and related method, in which high beam quality is achieved by varying the frequency of an input signal applied to all of the fiber amplifiers, to locate a frequency at which the amplifiers produce nearly coherent optical outputs. In spite of statistical variations in length and other factors among the fibers, there are frequencies at which the amplifiers produce nearly coherent outputs. In the control system of the invention, the input signal frequency is scanned across a selected narrow range and the beam quality is monitored by measuring on-axis far-field output beam intensity. The frequency is scanned until the beam intensity exceeds a selected threshold, and then the frequency is held constant until the beam intensity falls below a second selected threshold.

13 Claims, 3 Drawing Sheets

FREQUENCY SCANNED ARRAY CONTROL SYSTEM

BACKGROUND OF THE INVENTION

This invention relates generally to fiber amplifier arrays and, more particularly, to techniques for controlling the phase relationships of multiple emitters in a phased array of fiber amplifiers. Fiber amplifier arrays have been used or proposed to provide a high power optical source. Basically, the optical outputs of multiple fiber amplifiers in an array can be effectively combined to produce a high power beam if the phases of the individual amplifier outputs are controlled to provide a coherent composite beam.

Various methods have been proposed for controlling the phase of each emitter in a phased array of fiber amplifiers. Prior to this invention, the most successful of the methods involves measuring the phase of each emitter and adjusting the phase to produce a diffraction limited beam from the beam combining aperture of the array. An alternative scheme is to measure on-axis, far field power of the output beam and to provide a phase correction to each emitter to optimize the on-axis intensity of the beam. Another approach is to use analog heterodyne phase-locking techniques to lock the phase of each emitter to the phase of a master oscillator. The control systems needed to achieve phase control of the individual emitter outputs are effective in some of these approaches, but are also relatively complex and expensive to implement.

Therefore, there is still a need for a simpler and less expensive technique for coherently combining the outputs of multiple fiber amplifiers. The present invention satisfies this need.

SUMMARY OF THE INVENTION

In accordance with the present invention, a diffraction limited beam is generated from a fiber amplifier array by scanning the frequency of the input signal to the array to locate frequencies at which a diffraction limited beam is produced by chance. Briefly, and in general terms, the method of the invention comprises the steps of generating in a master oscillator an optical output of controllable frequency; coupling the master oscillator output into a plurality of optical fiber amplifiers disposed in an array; amplifying input optical signals in the optical fiber amplifiers and generating an array of amplified optical outputs from the optical fiber amplifiers. The method further comprises the steps of collimating the amplified optical outputs to form a composite output beam; sampling the composite output beam and generating a signal indicative of the intensity of the output beam; and varying the frequency of the master oscillator to maximize the beam quality of the composite output beam. The intensity signal provides a measure of beam quality of the output beam.

More specifically, the step of varying the frequency of the master oscillator comprises (a) varying the frequency over a selected range until the intensity of the composite output beam exceeds a first selected threshold; (b) maintaining a constant frequency after the first selected threshold is exceeded; (c) detecting when the intensity of the composite output beam subsequently falls below a second selected threshold; (d) re-initiating varying the frequency after the intensity falls below the second selected threshold; and (e) returning to step (a) to continue seeking a high output beam intensity.

Varying the frequency over a selected range may be accomplished by scanning the frequency from one end of the selected range to the other; and then repeating the scanning step, if necessary, until first selected intensity threshold is exceeded.

The invention may also be defined as a frequency scanned laser fiber amplifier control system for obtaining a nearly diffraction limited output. The system comprises a master oscillator for generating an optical output of controllable frequency; a plurality of optical fiber amplifiers disposed in an array; and means for coupling the master oscillator output into the plurality of optical fiber amplifiers. The input optical signals are amplified in the optical fiber amplifiers and provide an array of amplified optical outputs. The system further comprises a lens array, for collimating the amplified optical outputs to form a composite output beam; a beam splitter, for sampling the composite output beam; and an optical sensor for generating from the sampled output beam a signal indicative of its intensity. The intensity signal provides a measure of beam quality of the output beam. The system further comprises a frequency scan control module, for varying the frequency of the master oscillator based on the signal indicative of the intensity of the output beam, to maximize the beam quality of the composite output beam.

It will be appreciated from the foregoing summary that the present invention provides a significantly improved, yet very simple approach to achieving good beam quality from an array of optical fiber amplifiers. By scanning the frequency of the input signal applied to the array, the invention quickly locates frequencies at which the fibers provide practically coherent outputs. When thermal and other parameters change with time and the fibers are no longer coherent, frequency scanning is re-initiated, to locate another frequency at which the beam quality is maximized. Other aspects and advantages of the invention will become apparent from the following more detailed description, taken in conjunction with the accompanying drawings.

DETAILED DESCRIPTION OF THE INVENTION

Figure 1:
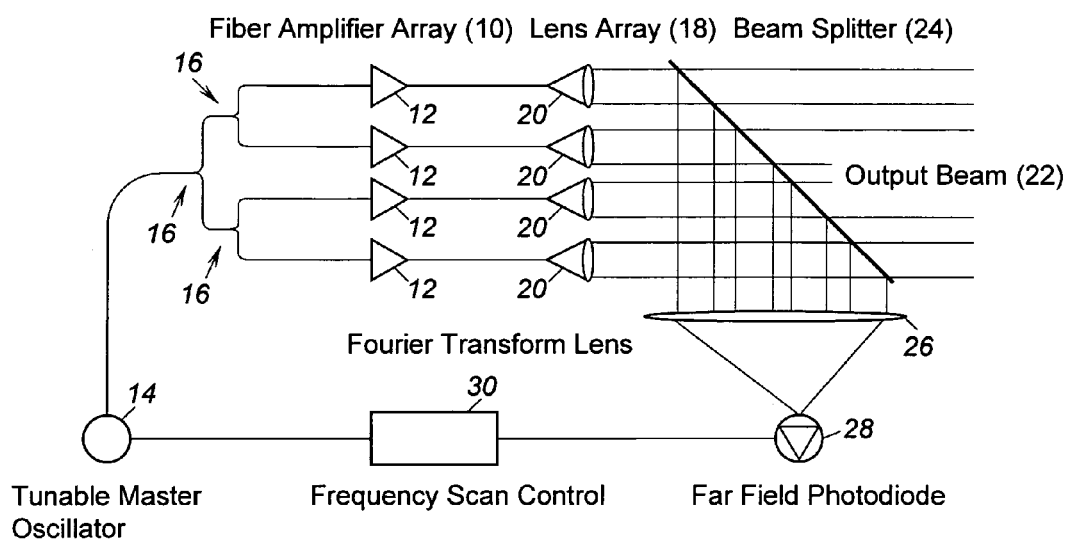
FIG. 1 is a block diagram of a frequency scanned array control system in accordance with the present invention.

As shown in the drawings for purposes of illustration, the present invention pertains to a technique for coherently combining the outputs of an array of fiber amplifiers, without the need for phase detection and adjustment of each output. As discussed above, prior art approaches using phase detection and adjustment were both complex costly.

In accordance with the present invention, input signals applied to the array of fiber amplifiers are scanned in frequency until a frequency is located that results in a nearly diffraction limited output. Successful operation of the invention is based on the discovery that as the frequency of the input signals is varied, it passes through "magic" frequencies at which the output beam quality peaks to an acceptably high value. At each one of these frequencies, it is theorized that all the array fibers are in phase, or almost in phase. Unfortunately, the frequencies at which this condition occurs can be expected to drift with time as the optical path lengths of the individual fibers vary with time, due to thermal effects or to nonlinear properties of the fiber material.

FIG. 1 is a block diagram of a system using frequency scanning in accordance with the invention. The system includes a fiber amplifier array 10 including, by way of example four fiber amplifiers 12. The amplifiers 12 receive practically identical optical input signals from a tunable master oscillator 14, which is coupled to the amplifiers through a series of appropriate optical splitters, indicated at 16. The optical outputs from the fiber amplifiers 12 are collimated by a lens array 18, of which four lenses 20 are shown, to produce a composite output beam 22. The output beam 22 is intercepted and sampled by a beam splitter 24, which reflects a portion of the output beam through a suitable lens 26 and onto a photodiode 28, referred to in the figure as the far field photodiode, since it senses the far field output of the array 10. The photodiode 28 produces an electrical output signal that is coupled to a frequency scan control module 30, which in turn generates a control signal to tune the master oscillator 14.

In operation, the frequency scan control module 30 initially begins scanning the frequency of the master oscillator in a selected direction, such as by linearly increasing the frequency with time. The far field photodiode provides an effective measure of beam quality, which is fed back to frequency scan control module 30. When the beam quality, as measured by the output on-axis intensity, exceeds an acceptable threshold, the frequency scan control module 30 stops the frequency scan and maintains the output of the master oscillator at the frequency that produced the acceptable beam quality. When the beam quality drops below the threshold by a selected margin, the frequency scan control module 30 re-initiates the frequency scan, and stops again when the beam quality returns to an acceptably high level. Frequency scanning is, therefore, started and stopped as needed to maintain the beam quality within acceptable limits over an extended time of operation. Although the beam quality may vary over a narrow range during the time that frequency scanning is stopped or is seeking a new "magic" frequency, the beam quality is maintained at a high average level during the entire period of operation. It will be understood that the beam quality, as measured by the Strehl Ratio, is proportional to the on-axis beam intensity in the far field.

Figure 2:
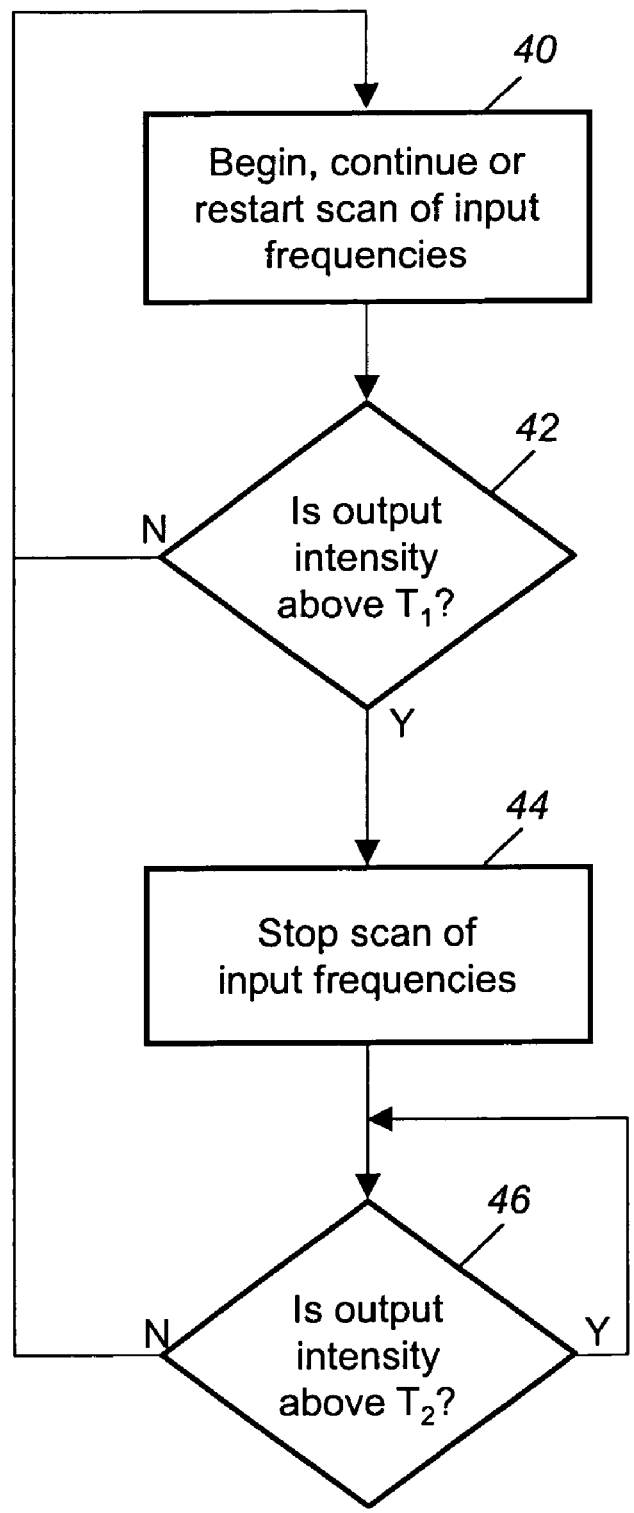
FIG. 2 is a flowchart showing the functions performed by the control system.

FIG. 2 shows the functions performed by the frequency scan module 30. Initially, a scan of input frequencies is started, as indicated in block 40. Then, as indicated in decision block 42, the output intensity is continuously monitored. If the intensity remains below a first selected threshold $T_1$, frequency scanning is continued. When the threshold is exceeded, the frequency scan is stopped, as indicated in block 44. Then the intensity is monitored as indicated in decision block 46, to determine whether the intensity has fallen below a second selected threshold $T_2$. If so, frequency scanning is re-initiated and the control system seeks another frequency that maximizes the output intensity.

An important consideration in designing the frequency scanning system described above is that the master oscillator bandwidth should be broad enough to prevent the occurrence of stimulated Brillouin scattering (SBS). This implies that the master oscillator bandwidth needs to be at least 1 GHz (gigahertz) for fiber amplifiers of 100 watts or greater output. However, the master oscillator bandwidth needs to be narrow enough to prevent beam quality degradation due to contributions from frequencies where the fibers are not in phase.

Another design consideration is that the frequency tuning period should be short enough to identify the "magic" beam quality frequency before major thermal drifts can cause more than a quarter of a wavelength in phase changes. Normally this is not a problem once the system reaches a steady state temperature. However, it has been observed that thermal drift of a few degrees can take many seconds before the beam quality changes enough to cause "hopping" to the a new frequency. A related consideration is the selection of on-axis intensity thresholds to start and stop frequency scanning.

The theory of operation of the invention is based on the conclusion that, although there are phase differences and fluctuations among the individual elements of the fiber array, there will always be statistical coincidences, at certain frequencies, where the phases of the outputs from the individual amplifiers will be practically coherent and the outputs will combine to provide a composite beam of relatively high beam quality. The phase differences and fluctuations among the individual array elements arise from a number of different sources, including: random differences in the lengths of the fibers in the array; thermal fluctuations that affect the phase of the fiber outputs because they impact both the fiber length and the refractive index of the fiber material; mechanical fluctuations; fluctuations in pump diode operation in the amplifiers; and non-linear effects such as changes in the fiber material refractive index. Some of these effects can be quantified theoretically and experimentally, but the simplicity of the present invention is such that none of these effects needs to be measured in order to maximize the beam quality of a composite output beam from a fiber amplifier array. Instead, the premise of the invention is to accept that fluctuating phase differences exist among the individual amplifiers of the array, and to seek statistical coincidences at which the outputs combine coherently to provide high beam quality.

The existence of these statistical coincidences or "magic" frequencies can be better appreciated from the theoretical consideration of an array N×M of single-mode fiber amplifiers having lengths that vary within a specified range, such as 0.5 m, over a nominal length of 100 m. That is, the total length of the fibers is $L_{n,m}=L_0+L_{nm}$, where $L_0$ is the nominal length and $L_{n,m}$ is a random length within the specified range. The array period is $x_d$ and $y_d$ along the x-axis and y-axis, respectively. The beams emitted by the fibers are assumed to be identical and have a waist radius of 1/e at amplitude of $w_0$. The total field at a distance z from the array is given by:

$$E(x, y, z) = e^{ikn_oL_o}\sum_{n,m} E_{n,m}(x, y, z)e^{i\Phi_{n,m}}$$

where $n_o$ is the refractive index of the fiber core, $k=2\pi/\lambda$, $L_o$ is a nominal length for the fibers, $\phi_{n,m}=k\,n_o\,(L_{n,m}-L_o)$, is the relative piston phase of the Gaussian beam $E_{n,m}(x,y,0)$ emitted by the {n,m} fiber in the array and z represents the distance from the array plane. The Gaussian beam emitted by the {n,m} fiber at z is given by [Baida Lu and Hong Ma, App. Opt. 39, 1279 (2000)]:

$$E_{n,m}(x, y, z) = \frac{q_o}{Aq_o + B}e^{-1\frac{\pi}{\lambda q(z)}[(x-x_{1d})^2+(y-y_{1d})^2]}e^{-ik(\varepsilon_x x+\varepsilon_y y)}e^{1(\varphi_x+\varphi_y)}$$

where {A,B,C,D} represents the ABCD matrix of the optical system between the fiber array and the observation plane at z, and $$q_o = i\frac{\pi w_o^2}{\lambda}$$

$$q(z) = \frac{q_o A + B}{q_o C + D}$$

$$\varepsilon_x = nCx_d$$

$$\varepsilon_y = mCy_d$$

$$x_{1d} = nAx_d$$

$$y_{1d} = mAy_d$$

$$\varphi_x = \frac{kAC}{2}n^2 x_d^2$$

$$\varphi_y = \frac{kAC}{2}m^2 y_d^2$$

To quantify beam quality (BQ), the concept of the Strehl of a beam is used since it is easier to calculate and more appropriate than other concepts used to define beam quality for arrays of emitters. For purposes of this description, the Strehl for the fiber array system is defined as:

$$S = \frac{\left|\sum_{n,m} E_{n,m}(0,0,z)e^{i\Phi_{n,m}}\right|^2}{\sum_{n,m} E_{n,m}(0,0,z)}$$

From the foregoing analysis, the Strehl ratios can be calculated for various wavelengths, using as an example a Yb (ytterbium) doped fiber system with a wavelength ranging from 1.05 µm to 1.055 µm, i.e., over a tuning range of 50 nm. Further, it is assumed that a microlens array with a period of 250 µm is used to collimate the output from the fibers so that the beam field radius is 80 µm. The fibers are assumed to have a nominal length of 100 m plus a random length variation among the fibers of 50 cm.

Figure 3A:
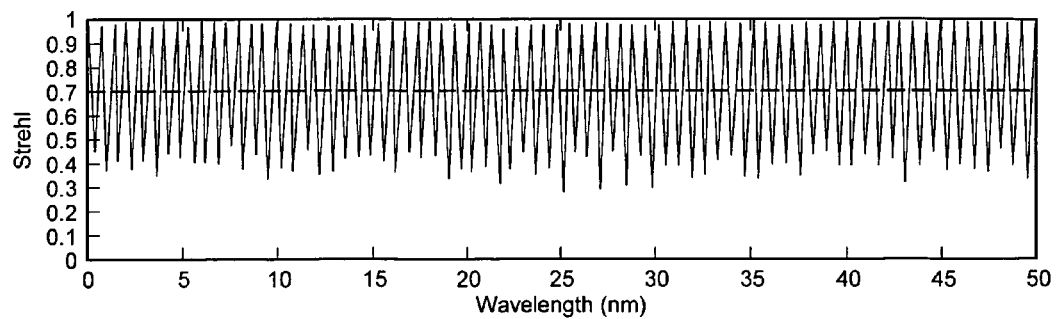
FIGS. 3A, 3B and 3C are graphs depicting the variation of Strehl function with frequency for arrays of 2×2, 3×3 and 4×4 fibers, respectively.
Figure 3B:
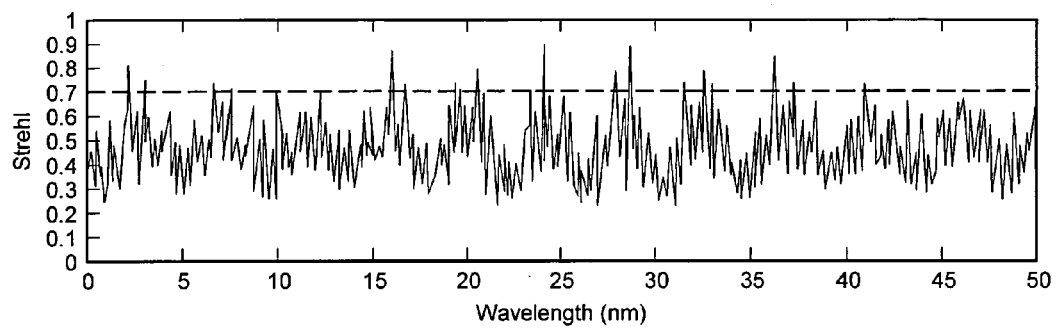
Figure 3C:
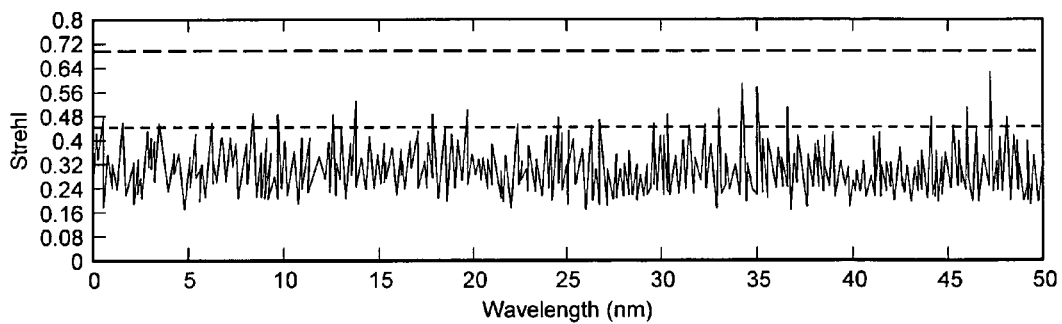

The Strehl as a function of wavelength is plotted in FIGS. 3A, 3B and 3C for arrays of 2×2, 3×3 and 4×4 fibers, respectively. For the 2×2 array, it will be observed that there is a very regular and frequent occurrence of Strehl peaks, any of which may be used to obtain a desirably high beam quality by tuning the frequency to the first encountered peak and then maintaining that frequency until the peak drifts away from the maintained frequency because of thermal or other effects in the fibers. For the 3×3 array, the number of Strehl peaks in the frequency range of interest is not as great, but still these peaks can be seen to occur on a regular basis over the frequency range. Similarly, in the 4×4 array the Strehl peaks are of lesser magnitude and those of higher magnitude are less frequent. This progression from FIG. 3A through FIG. 3C suggests that there is a practical upper limit to the array size for which the present invention operates successfully. The greater the number of fibers, the less likely it is that one can locate statistical coincidences at which all of the fibers produce nearly in-phase outputs. For arrays of a reasonable size, however, one can readily locate frequencies the result in high beam quality.

It will be appreciated from the foregoing that the present invention represents a significant advance in high power laser fiber amplifier arrays. Such arrays have important military applications, as well as important commercial applications for material processing. It will also be appreciated that, although a specific embodiment of the invention has been illustrated and described, various modifications may be made without departing from the spirit and scope of the invention. Accordingly, the invention should not be limited except as by the appended claims.

The invention claimed is:

1. A method for obtaining a nearly diffraction limited output from an array of optical fiber amplifiers, the method comprising:
   generating in a master oscillator an optical output of controllable frequency;
   coupling the master oscillator output into a plurality of optical fiber amplifiers disposed in an array;
   amplifying input optical signals in the optical fiber amplifiers and generating an array of amplified optical outputs from the optical fiber amplifiers;
   collimating the amplified optical outputs to form a composite output beam;
   sampling the composite output beam and generating a signal indicative of an intensity of the composite output beam, wherein the signal provides a measure of beam quality of the output beam; and
   varying the frequency of the master oscillator based on the signal indicative of the intensity of the composite output beam to maximize the beam quality of the composite output beam.

2. A method as defined in claim 1, wherein the step of varying the frequency of the master oscillator comprises:
   (a) varying the frequency over a selected range until the signal of the composite output beam exceeds a first selected threshold;
   (b) maintaining a constant frequency after the first selected threshold is exceeded;
   (c) detecting when the intensity of the composite output beam subsequently falls below a second selected threshold;
   (d) re-initiating varying the frequency after the intensity falls below the second selected threshold; and
   (e) returning to step (a) to continue seeking a high output beam intensity.

3. A method as defined in claim 2, wherein the step of varying the frequency over a selected range comprises:
   scanning the frequency from one end of the selected range to the other until the first selected threshold is exceeded.

4. A frequency scanned laser fiber amplifier control system for obtaining a nearly diffraction limited output, comprising:
   a master oscillator for generating an optical output of controllable frequency;
   a plurality of optical fiber amplifiers disposed in an array;
   means for coupling the master oscillator output into the plurality of optical fiber amplifiers, wherein the input optical signals are amplified in the optical fiber amplifiers and provide an array of amplified optical outputs;
   a lens array, for collimating the amplified optical outputs to form a composite output beam;
   a beam splitter, for sampling the composite output beam;
   an optical sensor for generating from the output beam sample a signal indicative of the intensity of the output beam, wherein the intensity signal provides a measure of beam quality of the output beam; and a frequency scan control module, configured to vary the frequency of the master oscillator based on the signal indicative of the intensity of the output beam, to maximize the beam quality of the composite output beam.

5. A frequency scanned laser fiber amplifier control system as defined in claim 4, wherein the frequency scan control module comprises:
   (a) means for varying the frequency over a selected range until the intensity of the composite output beam exceeds a first selected threshold;
   (b) means for maintaining a constant frequency after the first selected threshold is exceeded;
   (c) means for detecting when the intensity of the composite output beam subsequently falls below a second selected threshold; and
   (d) means for re-initiating varying the frequency after the intensity falls below the second selected threshold.

6. A frequency scanned laser fiber amplifier control system as defined in claim 5, wherein then means for varying the frequency over a selected range comprises:
   means for scanning the frequency from one end of the selected range to the other until the first selected threshold is exceeded.

7. The method of claim 1, wherein the step of sampling the composite output beam and generating the signal indicative of the intensity of the composite output beam comprises the step of:
   generating a Strehl ratio of the composite output beam.

8. The frequency scanned laser fiber amplifier control system as defined in claim 4, wherein the plurality of optical fiber amplifiers comprise an output power of at least 100 watts;
   wherein the master oscillator comprises a bandwidth of at least 1 GHz.

9. The frequency scanned laser fiber amplifier control system as defined in claim 4, wherein the plurality of optical fiber amplifiers comprise a plurality of ytterbium doped fibers.

10. The frequency scanned laser fiber amplifier control system as defined in claim 9, wherein the ytterbium doped fibers comprise an operating range of 1.05 µm to 1.055 µm.

11. The frequency scanned laser fiber amplifier control system as defined in claim 4, wherein the lens array comprises a microlens array with a period of 250 µm.

12. The frequency scanned laser fiber amplifier control system as defined in claim 11, wherein the composite output beam comprises a beam field radius of 80 µm.

13. The frequency scanned laser fiber amplifier control system as defined in claim 4, wherein the plurality of optical fiber amplifiers are disposed in a 2×2, 3×3, or 4×4 array.

* * * * *